H. J. RUGGLES.
SAFETY VALVE FOR PNEUMATIC TIRES.
APPLICATION FILED AUG. 6, 1912.
1,114,047.
Patented Oct. 20, 1914.
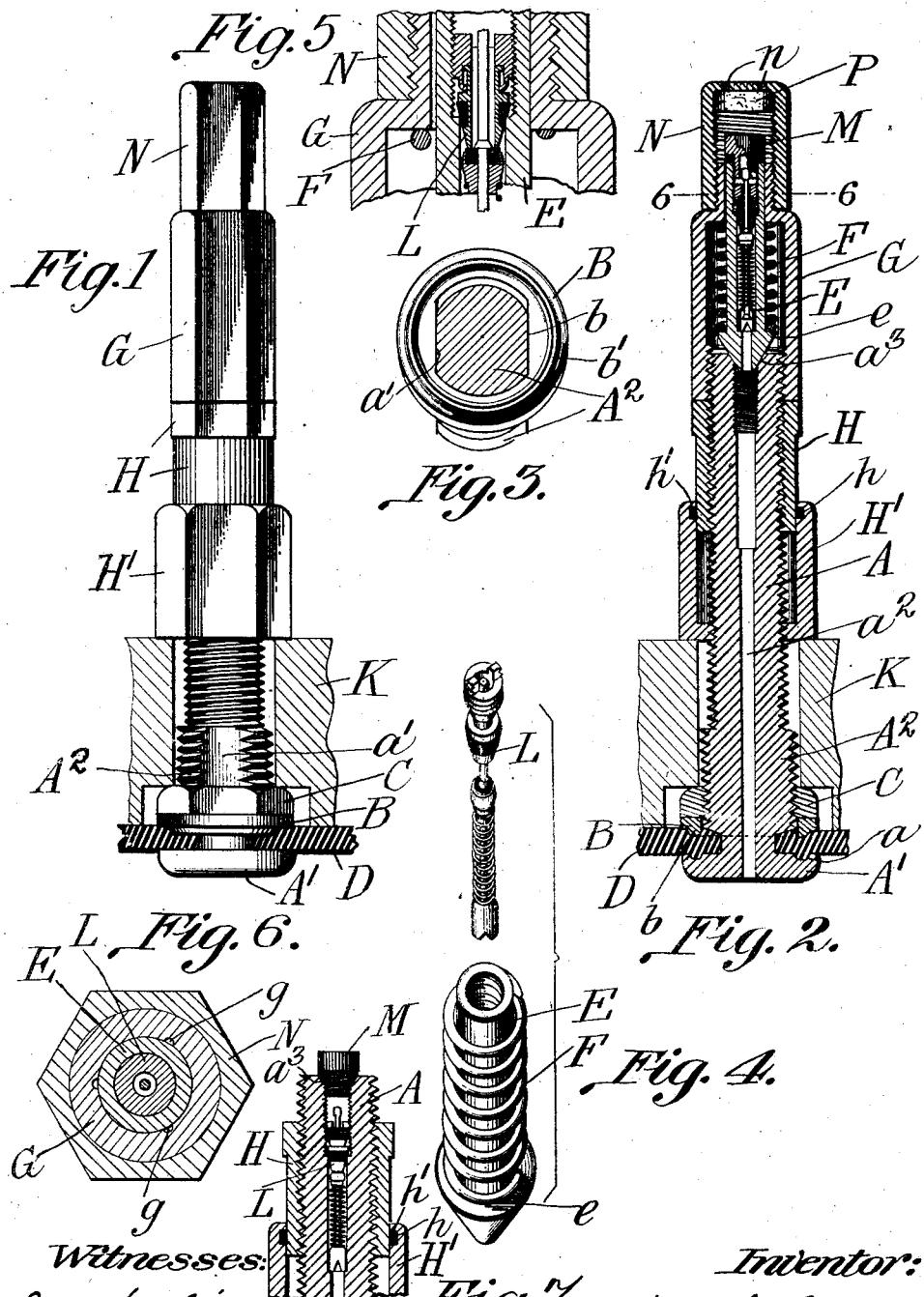

UNITED STATES PATENT OFFICE.

HARVEY J. RUGGLES, OF JACKSON, MICHIGAN.

SAFETY-VALVE FOR PNEUMATIC TIRES.

1,114,047.  Specification of Letters Patent.  Patented Oct. 20, 1914.

Application filed August 6, 1912. Serial No. 713,567.

*To all whom it may concern:*

Be it known that I, HARVEY J. RUGGLES, a citizen of the United States, residing at Jackson, in the county of Jackson and State of Michigan, have invented certain new and useful Improvements in Safety-Valves for Pneumatic Tires; and I do hereby declare the following to be a full, clear, and exact description of the invention, such as will enable others skilled in the art to which it appertains to make and use the same.

This invention relates to safety valves for pneumatic tires, and has for its object to provide an improved construction of combined safety valve and check valve, which will prevent explosion of the tire from excessive air pressure, which will exclude dust from the working parts of the valves, and which embodies other improvements hereinafter described.

The invention will be first hereinafter more particularly described with reference to the accompanying drawings, which are to be taken as a part of this specification, and then pointed out in the claims at the end of the description.

In the drawings, Figure 1 is a side elevation of one of my improved valves attached to the rim of a wheel and secured to a pneumatic tire, said rim and tire being shown in section; Fig. 2 is a central vertical section through the valve, rim and tire; Fig. 3 is a detail perspective view of the tire-clamping washer and a portion of the valve stem; Fig. 4 is an enlarged detail view of the combined safety valve and check valve, the latter being shown removed from the former; Fig. 5 is an enlarged sectional view through parts of the check valve, safety valve and valve case to more clearly illustrate how the check valve is secured within the safety valve; Fig. 6 is an enlarged cross section on the line 6—6 of Fig. 2, illustrating the longitudinal grooves in the bore of the valve case for permitting the escape of air when the safety valve is opened; and Fig. 7 is a broken central longitudinal section of the upper part of the valve stem, showing how the check valve may be fitted therein and the safety valve dispensed with, if desired.

Referring to the drawings by letters of reference, A denotes the valve stem which is provided on its inner end with a flange A′ having an annular groove $a$ formed in its surface. A portion $A^2$ of the valve stem adjacent the flange is made larger in diameter than the remainder of said stem and has flattened sides $a'$ which are engaged by corresponding straight inner edges $b$ of a washer B which is provided with a projecting annular rib $b'$ registering with the groove $a$ in the flange A′. A nut C is screwed upon the portion $A^2$ of the valve stem and engages the washer for clamping the inflatable tube or tire D between said washer and the flange A′. In this clamping action, the rib $b'$ forces a portion of the tire into the groove $a$ in the flange, thereby effecting a very secure and air tight joint between the valve stem and tire.

The greater portion of the valve stem A is made smaller in diameter than the part $A^2$, so that the threads need not be interrupted throughout the length of the stem, but simply on the part adjacent the flange where it is necessary to have flattened portions to prevent the washer from turning. The valve stem is formed with a passage $a^2$ extending throughout its length, and at the outer end of said stem a valve seat $a^3$ is formed around said passage. The safety valve E has its lower end ground to fit said valve seat, and is also formed with a shoulder $e$ against which abuts one end of a helical spring F fitted around said safety valve. A valve case G incloses the valve and spring F and screws upon the end of the valve stem A. The upper end portion X of said valve case fits closely around the safety valve, forming a working chamber therefor, and also provides a shoulder serving as an abutment for the upper end of the spring F. The tension of said spring may be varied by adjusting the valve case upon the valve stem, and for this purpose the external surface of said case may be hexagonal in cross section, as shown, or otherwise formed for engagement by a wrench.

An expanding nut is mounted on the valve stem between the valve case G and the enlarged portion $A^2$ of said stem. This expanding nut is made in two parts, one of which is adapted to telescope within the other. One of said parts H serves as a lock nut against the valve case, while the other part H′ is designed for clamping upon the inner surface of the wheel rim K. An annular groove $h$ is formed in the bore of the outer part of the expanding nut, and contains a gasket $h'$, of rubber or other suitable material, which hugs the inner part of the expanding nut, thereby excluding dust from entering between the two parts. As illustrated, when the valve is in position, the expanding nut completely covers the portion of the valve stem between the wheel rim and valve case.

A check valve L, of known construction, is fitted within the safety valve, which is centrally bored throughout to receive it, and to permit air to be forced through the same into the tire via the passage $a^2$ in the valve stem. To inflate the tire, the nozzle of a pump is attached to the outer end of the safety valve in the same manner as it is usually attached to the valve stem. The outer end of said safety valve casing is externally threaded to receive a cap N which is perforated as at $n$ (Fig. 2) and provided with a sponge P, or the like, covering said perforations for the purpose of excluding dust. The upper portion of said valve case is further provided with longitudinal grooves $g$ in its bore, as illustrated in Fig. 6, whereby the interior or chambered portion of said valve case is placed in communication with the interior of the cap when the latter is in place.

In operation, if the air pressure within the tire exceeds the pressure exerted by the spring F, the safety valve will be automatically raised from its seat allowing the excess of air to escape from the tire via the passage $a^2$ in the stem, the chambered portion of the valve case, the grooves $g$ in the bore of its upper end, and the perforations $n$ in the cap N. It will be understood, of course, that this excess air percolates through the sponge P in order to reach the perforations $n$.

The outer portion of the bore or passage of the valve stem is preferably prepared to receive the check valve, as shown in Figs. 2 and 7, so that in case it becomes necessary or desirable the safety valve may be dispensed with and the device used as an ordinary check valve. When this is done, the plug M is screwed into the end of the valve stem so as to cover the seat $a^3$ for the safety valve, as illustrated in Fig. 7.

Having thus described my invention, what I claim as new and desire to secure by Letters Patent is:—

1. The combination with a valve stem having a passage therethrough with a valve seat at its outer end; a case mounted on the stem and constructed with a reduced portion providing a valve working chamber, and forming an abutment; a safety valve closely fitting and working within said chamber; said reduced casing portion having grooves formed adjacent the valve providing air passages; a spring surrounding said valve and having its respective ends engaging with the valve and said abutment and normally holding the valve seated under tension; a check valve mounted on said safety valve; and a second case mounted on the first case and provided with openings forming air passages.

2. The combination with a valve stem having a longitudinal passage with a valve seat at its outer end, a spring-pressed safety valve normally engaging said valve seat, a valve case housing said valve and adjustable on the valve stem for tensioning the spring, and an expanding nut mounted on the stem and comprising telescoping parts, one adapted to lock said valve case, and the other part adapted to clamp against the rim of a wheel.

3. The combination with a valve stem having a longitudinal passage with a valve seat at its outer end, a spring-pressed safety-valve normally engaging said valve seat, a valve case housing said valve and adjustable on the valve stem for tensioning the spring, and an expanding nut mounted on the stem and comprising telescoping parts, one adapted to lock said valve case, and the other part adapted to clamp against the rim of a wheel, said expanding nut completely covering the portion of the stem extending between the case and rim.

4. The combination with a valve stem having a longitudinal passage with a valve seat at its outer end, a spring-pressed safety valve normally engaging said valve seat, a valve case housing said valve and adjustable on the valve stem for tensioning the spring, an expanding nut mounted on the stem and comprising telescoping parts, one adapted to lock said valve case, and the other part adapted to clamp against the rim of a wheel, the outer part of said nut having an annular groove in its bore, and a gasket in said groove hugging the inner part of the nut for the purpose specified.

In testimony whereof I affix my signature in the presence of two witnesses.

HARVEY J. RUGGLES.

Witnesses:
GEORGE H. CURTIS,
FRED FULLERTON.